Dec. 3, 1968  F. K. BECK  3,414,657

AUTOMATIC CONTROL SYSTEM

Filed Jan. 5, 1967

INVENTOR
FERDINAND KARL BECK
BY
McGlew and Toren
ATTORNEYS

Dec. 3, 1968     F. K. BECK     3,414,657
AUTOMATIC CONTROL SYSTEM
Filed Jan. 5, 1967     4 Sheets-Sheet 3
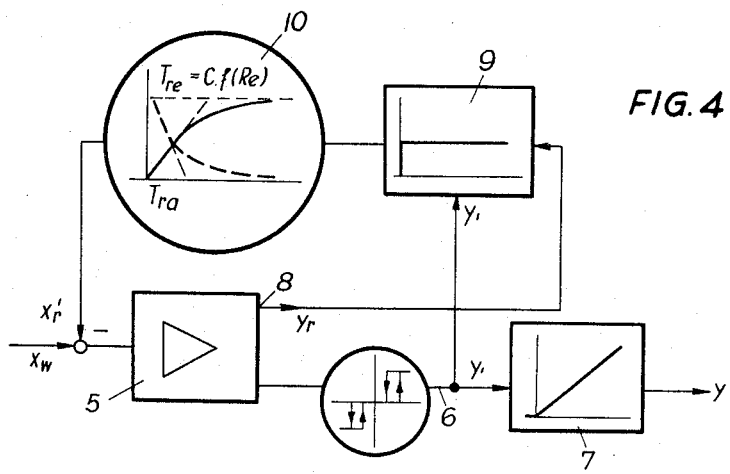
FIG. 4
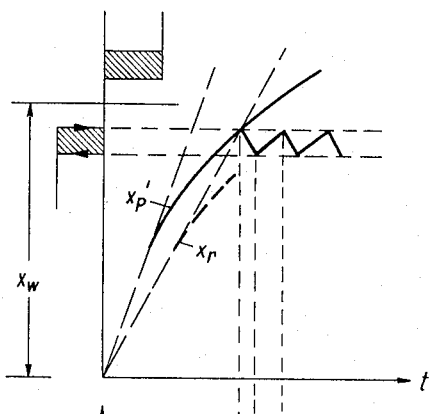
FIG. 5
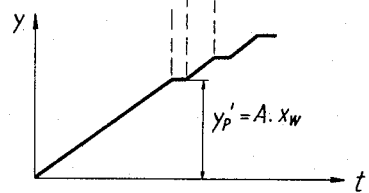
INVENTOR
FERDINAND KARL BECK
BY
    ATTORNEYS

INVENTOR
FERDINAND KARL BECK

United States Patent Office 3,414,657
Patented Dec. 3, 1968

3,414,657
AUTOMATIC CONTROL SYSTEM
Ferdinand Karl Beck, Vienna, Austria, assignor to
Wiener Schwachstromwerke Gesellschaft m.b.H.,
Vienna, Austria
Filed Jan. 5, 1967, Ser. No. 607,501
Claims priority, application Austria, Jan. 13, 1966,
A 282/66
18 Claims. (Cl. 13—13)

ABSTRACT OF THE DISCLOSURE

A control system, especially suited for electrode position control of arc furnaces, wherein the time constant of a compensating signal depends on the magnitude of a deviating signal. The changing time constant is accomplished from utilizing a non-linear resistance combination.

---

This invention relates to a single-point action control system, particularly for use with electric arc furnaces, especially for controlling the electrode position in melting or alloying furnaces and the like, wherein the controlled variable is the ratio between the rectified values of the vectors of two electrical parameters of the electric arc and in which that component of one of said parameters is utilized which lies in the direction of the other of said parameters, and a controller provided with a compensating delay line which includes a resistance circuit.

A system for controlling the electrodes of an arc melting furnace serves for positioning the electrodes at such a distance from the bath that the arc furnace is maintained at its optimum condition of operation. In a known control system, the desired value is a predetermined relation between electrode current and electrode voltage. The signals applied to the controller are derived from the electrode current, which is converted in a converter into a voltage that is proportional to the current, and from the electrode voltage between the transformer end of the supply lead to the electrode and the furnace vessel. The two measured values are separately rectified and the rectified values are applied to a voltage divider, which serves to derive a differential voltage. The rectified values are applied in series opposition to the component resistors of the voltage divider. The differential voltage is applied to the input of a relay controller, which causes an electric motor or an electromagnetically controlled hydraulic transmission to perform a step so as to lift and lower the electrodes, depending on the sign of the deviation.

It is known that an increase in the distance from the electrode to the bath causes a decrease of the time interval between the passage to zero of the sinusoidal mains voltage and the assumedly square-wave arc voltage, and an increase of the igniting voltage. Depending on the degree of ionization, the required igniting voltage may be lower or higher than the mains voltage which is currently available. When the required igniting voltage exceeds the mains voltage which is currently available, the ignition will be delayed during each half wave. Owing to the time intervals in which the arc current is interrupted, the electric arc is highly unstable and its igniting phase angle depends on the ratio of the effective resistance to the inductive impedance of the arc circuit. To obtain a stable arc for an optimum operation, the converter output which is proportional to the electric current may be applied through a series resistor to a capacitor and the voltage across this capacitor may be applied to a rectifying bridge circuit used to derive one of the rectified signals.

In a controller having a relay output it is also known to use a compensating delay line so as to obtain a time response which results, e.g., in a proportional-plus-integral control action of the entire system.

It is an object of the invention to provide a control system which has a relay output and in which the time function of the compensating signal depends on the magnitude of the deviating signal so as to improve the operation of the furnace.

In order to solve this object, the above-defined system for controlling the electrode position is characterized in that the resistance circuit is connected preferably by a gate to a controller output for the compensating signal, the resistance circuit includes a resistance combination which serves for changing the time constant of rise of the compensating circuit and has a current-voltage characteristic having a predetermined slope at any given point, said resistance combination being preferably connected in series with a capacitor, the resistance of the resistance combination decreasing according to a non-liner function in response to an increase of the compensating signal supplied by the controller.

According to a further feature of the invention, the non-linear resistance combination connected to the gate of the controller, e.g., to a thyristor, comprses a resistor and diodes which are differently biased by auxiliary voltage sources and serve as switches to connect further resistors to the first-mentioned resistance when the compensating voltage, which is proportional to the deviation signal, exceeds the threshold values of the diodes. The controller is provided with at least one relay output for moving the electrodes, and the non-linear resistance combination together with the series capacitor has, for the compensating signal, a time constant of rise which is smaller than the time constant of decay, which is determined by the capacitance of the capacitor and a discharge resistor connected in parallel to said capacitor.

The nature of the invention resides in that the controller has a relay output and a compensating delay line is provided, which includes a resistance-capacitance element which has a time constant of rise that is reduced as the deviation signal is increased. In the case of a relatively large response of the controller, the time constant of the delay line is correspondingly reduced. The shorter the time constant of rise, the shorter will be the time required until the compensating signal $x_r$ is sufficient to offset the deviation signal $x_w$. In an arc furnace in which the servo motor has a relatively high speed and there are large step changes of the deviation signal, this system will result in an aperiodic correcting action. This stabilization of the control action is due to the non-linear compensation. A few correcting steps, which succeed the first and are similar to it, serve to move the electrode to the position required for an optimum operation of the furnace. The non-linear behavior of the resistance circuit will avoid a hunting before the desired operating condition is reached.

An embodiment of the invention is shown by way of example in the drawing and will now be described in detail.

FIG. 4 is a simplified block diagram showing a three-position action control system comprising a compensating line which includes a non-linear resistance circuit as shown in FIG. 3.

FIG. 5 is a graph representing the action of the control system of FIG. 4 in response to a large initial step change of the deviation signal.

Figure 1:
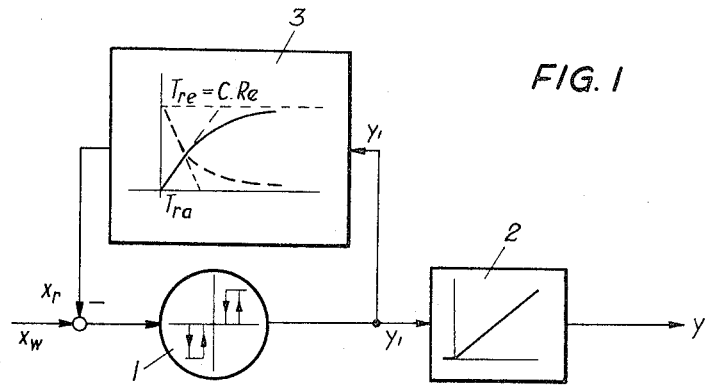
FIG. 1 is a simplified block diagram of a three-position action control system including a compensating delay line which comprises a resistance circuit having resistance and capacitance elements.
Figure 2:
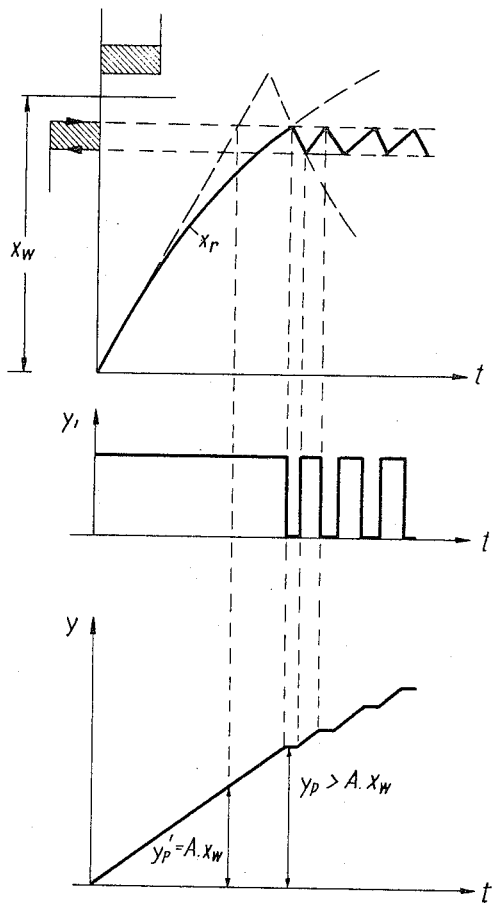
FIG. 2 is a graph representing the control action of the control system of FIG. 1 in response to a large initial step change of the deviation signal.

In the drawing, FIG. 1 is a block diagram of a known three-position action controller, which comprises a relay amplifier 1, an integrating servo motor 2 and a compensating circuit 3, which comprises delay lines having resistance and capacitance elements. One of the delay lines having a time constant of rise includes a capacitor, which is discharged in dependence on a time constant of decay when the controller is de-energized. The mode of operation will be explained with reference to FIG. 2. It may be assumed that a deviation signal $x_w$ is applied to the input of such controller. The relay amplifier 1 will then cause the compensating signal $x_r$ to increase in accordance with a function of $e$. The deviation signal $x_w$ and the compensating signal $x_r$ opposing the same are plotted on the axis of ordinates. The relay amplifier will then operate until the compensating signal is $$x_r = x_w - \frac{x_T}{2}$$

wherein $$x_T/2$$

is one-half of the dead band of the relay amplifier. When the correcting signal $y_1$ disappears, the capacitor is discharged according to the preset time constant of decay. The difference between the deviation and compensating signals increases again until the controller responds. Another correcting step within the hysteresis function of the relay amplifier results. This amplifier transforms the deviation signal into a sequence of pulses having the magnitude $y_1$. The servo motor which succeeds the relay amplifier integrates the output pulses. The variation of the correcting signal $y$ with time is shown in FIG. 2. The first pulse moves the final control element by a predetermined distance, which may be considered the proportional term of the transient response. An integral component is added thereto, which is similar to a series of steps and the slope of which is determined by the turn-on and turn-off times of the controller. Whereas the proportional term may be adjusted with the time constant of rise, the fact that the compensating signal varies in accordance with a function of $e$ results in the case of large deviations in a non-linear increase of the proportional term, so that the control system has a cumulative action in the case of large deviations. For an economical operation of a furnace, the dead times and the response times of the control system are kept short. During various operating conditions of the furnace, e.g., during a collapsing of scrap or a melting of steel having a very low carbon content, the electrode speed must exceed a certain minimum. In the known control systems having a relay output, this high speed of the electrodes results in electrode hunting due to the cumulative action of the control system. When the distance of the electrode from the bath level becomes excessive, the unstable arc may break altogether. The cumulative action of the control system during the operating conditions which have been described hereinbefore does not ensure an economical operation of the arc melting furnace.

Figure 3B:
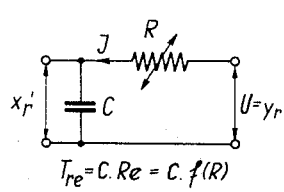
FIGS. 3a, 3b and 3c show a non-linear resistance circuit which is used in a compensating delay line and serves for changing the time constant of rise of the compensating delay line.
Figure 3A:
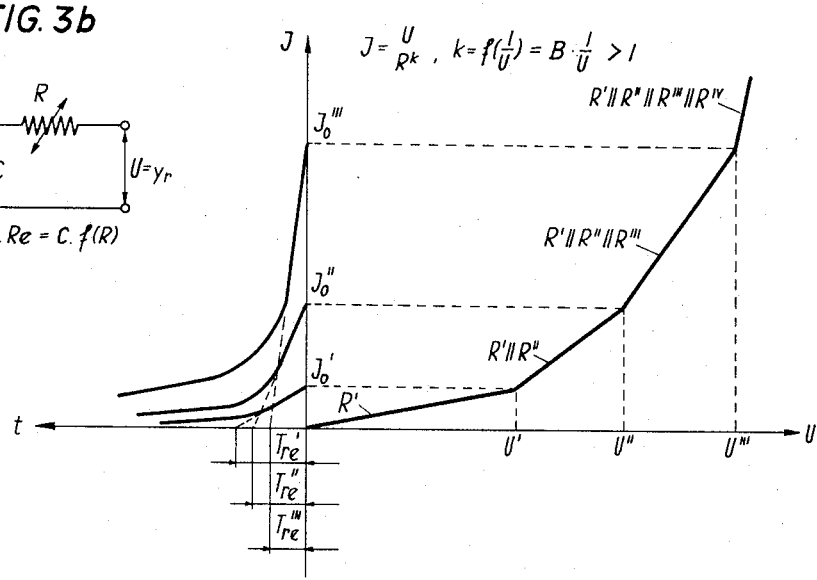
Figure 3C:
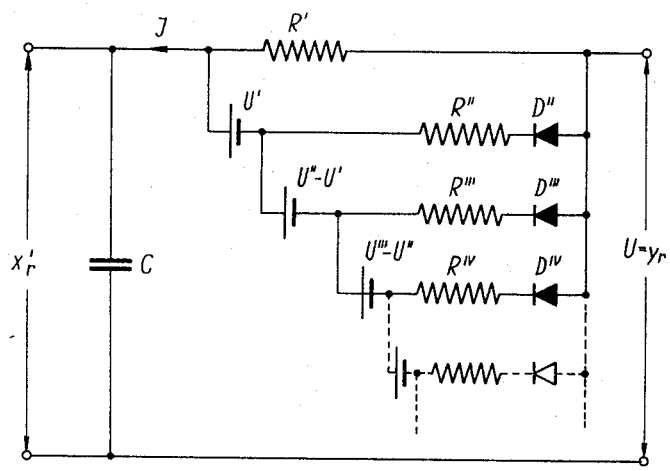

FIG. 3 shows a compensating delay line which has a resistance circuit and in which the time constant of rise decreases as the deviation signal increases. This behavior of the resistance circuit for charging a capacitor is accomplished by the use of a non-linear characteristic, which is replaced in FIG. 3 by a broken line. The electrical circuit for simulating this current-voltage characteristic having a predetermined slope at any given point comprises resistors, which are connected in parallel in dependence on the output signal $y_r$, which is proportional to the deviation signal $x_w$. The electrical circuit for simulating this broken line comprises parallel resistors $R'$, $R''$, $R'''$, $R^{IV}$ ..., which can be connected into and disconnected from the circuit by diodes having different bias voltages and responsive to a change of the deviation signal $x_w$ above and below predetermined values. The use of a sufficiently large number of biased diodes enables a sufficiently close approximation to a predetermined non-linear characteristic of the resistor circuit.

The mode of operation of a control system having a compensating delay line has already been described with reference to FIGS. 1 and 2. The resistance network of the embodiment shown in FIG. 3 has a non-linear current-voltage characteristic, which may be represented by a broken line. It is assumed that the diodes $D''$, $D'$ are conducting when the output voltage $y_r$ is higher than $U''$ and lower than $U'''$ and in this condition the resistors $R'$, $R''$, $R'''$ are connected in parallel to reduce the overall resistance of the resistance network. Owing to this behavior of the resistance circuit, a high output voltage $y_r$, which is due to a large deviating signal, is accompanied by a reduced time constant of rise $T_{re}$ so that the capacitor voltage rises more rapidly. This capacitor voltage constitutes a compensating voltage $x_r'$ and is applied to the input in opposition to the deviating signal $x_w$.

In the embodiment shown in FIG. 4 the amplifier 5 of the control system has two outputs. One output has a three-position hysteresis function and applies a correcting signal $y_1$ to an integral-action servo motor 7. The direction of rotation of the servo motor 7 depends on the sign of the deviation signal $x_w$. The other output 8 of the amplifier 5 is adapted to apply an output signal $y_r$, which is proportional to the deviating signal $x_w$, through a normally blocked gate 9 to the non-linear resistance circuit 10, which has a time constant of rise $T_{re}$ decreasing with an increase of the output signal $y_r$. The larger the initial step change of the deviation signal $x_w$, the larger will be the decrease of the time constant of rise $T_{re}$ so that a large initial step change causes a rapid rise of the compensating signal $x'$ as a proportional term $y_p'$ of the correcting signal. The value of this correcting signal remains proportional to the initial step change even though this has increased close to the upper limit of the operating range of the control system. Thus, a large initial step change $x_w$ will not result in a cumulative action of the control system in spite of a high speed of the servo motor 7.

After a correcting pulse $y_1$ of longer duration, which is substantially proportional to the deviation signal, a few further correcting pulses of shorter duration may be required, which have the same polarity as the first correcting pulse. After the first correcting pulse, which is relatively long, the capacitor is discharged with a predetermined time constant of decay $T_{ra}$. During this time, the sum of the deviation signal $x_w$ and the compensating signal $x_r'$ increases again to the response threshold of the controller. The resulting control cycle is determined by the hysteresis of the three-position action control system. The linear portion of the characteristic curve of the correcting signal $y$ is succeeded by a short portion which is similar to a series of steps. As a result, the non-linear resistance circuit in the compensating line provides for an aperiodic control action even in response to large initial step changes of the deviation signal.

An embodiment of the invention as applied to an electrode position control will now be described with reference to FIG. 6 of the drawing. In this example, the real component of the furnace impedance is used as a controlled variable.

Figure 6:
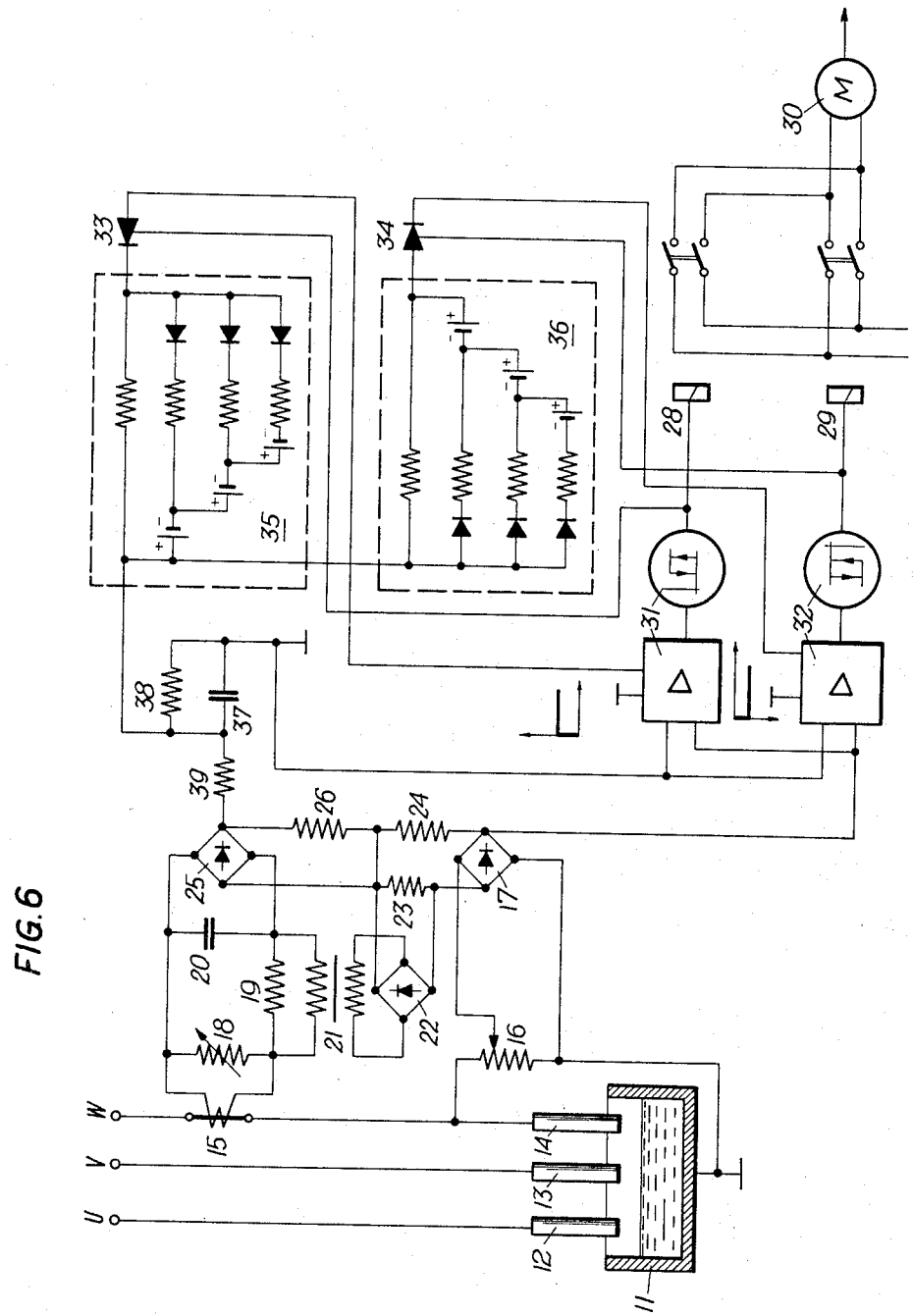
FIG. 6 is a circuit diagram of the means for controlling the electrode position in an arc furnace which is provided with a control system including a compensating line which comprises a non-linear resistance circuit as shown in FIG. 3.

FIG. 6 shows an electric arc furnace 11 having three electrodes 12, 13, 14, which are respectively connected to phases U, V, W of a furnace transformer, not shown. The control system is shown in FIG. 6 only for phase W and is similar for the two other phases. The phase lead connected to electrode 14 includes the primar winding of a current transformer 15. In the secondary winding of this controller, a voltage is induced which is proportional to the electrode current. The electrode voltage tapped between the lead of the electrode 14 and the furnace vessel 11 is applied to an adjustable resistor 16, which is succeeded by a rectifying bridge circuit 17. The secondary circuit 15 of the current transformer 15 includes an adjustable load resistor 18. The voltage across the resistor 18 is applied to a voltage divider, which consists of a resistor 19 and a capacitor 20 connected in series. The voltage across the resistor 19 serves for compensating the voltage drops which are due to the electrode lead, the electrode and the resistances associated with the furnace parts. The primary of a transformer 21 is connected between the ends of the resistor 19. The secondary of transformer 21 is connected to a further rectifying bridge network 22. The output voltage of the rectifying bridge network 22 is applied to a resistor 23 and is opposed to the output voltage of the rectifying bridge network 17. The voltage across the resistor 24 of the voltage divider corresponds to the voltage of the electric arc because the voltage across the resistor 23 compensates the additional voltage drops in the furnace.

A rapid electrode position control during inefficient furnace operation is ensured by the capacitor 20, which enables a shifting of the phase of the voltage which is proportional to the arc current. This capacitor 20 is connected in series with the resistor 19 to the resistor 18, which constitutes a load on the current transformer 15. In this arrangement, that component of the arc current is mainly utilized which lies in the direction of the non-interlinked phase voltage of the furnace, and the control action is mainly based on the real component of the arc impedance. When the furnace is operating under the normal load, the voltage across the capacitor is in phase with the voltage across the furnace. Under different operating conditions of the furnace there will be a slight phase displacement between the voltage across the furnace and the capacitor. This phase displacement is not significant for the operation of the control system. The voltage across the capacitor 20 is applied to the rectifying bridge network 25, which has an output applied to the resistor 26 of the voltage divider. The two resistors 24, 26 of the voltage divider are connected in series. The difference between the voltages across these resistors is used as the input signal to the control system.

The apparatus for controlling the electrode position in the electric arc furnace comprises an open loop channel and a compensating delay line, which includes non-linear resistance circuit such as is shown in FIG. 3. The open loop channel of the control system operates as a three-position switch having a hysteresis and a dead band and controlling the servo motor 30 for rotation in the left-hand or right-hand sense by the contactors 28, 29, depending on the sign of the deviation signal. The servo motor 30 is connected to the means for positioning the electrode and changes the distance between the electrode and the bath level until the furnace operates under normal conditions.

The open loop channel of the control system comprises the two amplifiers 31, 32. Each of these amplifiers comprises a proportional output, which is proportional to the deviation signal, and a relay output. The contactors 28 and 29 for controlling the motors, and the normally blocked gates 33 and 34, are operable by the relay outputs of amplifiers 31 and 32, respectively. The normally blocked gates 33, 34 are controlled semiconductor rectifiers, such as thyristors, and their main terminals are connected between the proportional output of the amplifier 31 or 32 and the input of the respective compensating delay line. The time constant of rise of the compensating delay lines is proportional to the product of the resistance of the non-linear resistance circuits 35, 36 and the capacitance of capacitor 37. The mode of operation of the resistance circuits 36, 35 has been described with reference to FIG. 3 and is similar in design to that of FIG. 3. Depending on the sign of the deviation signal, one or the other of the two resistance networks is connected in circuit by the normally blocked gate 33 or 34. When the proportional output of the amplifiers 31 and 32 is blocked by the gates 33 and 34, the capacitor 37 will be discharged through the resistor 38 and a series circuit, which is parallel to the resistor 38 and consists of an isolating resistance 39 and the two resistors 24, 26 of the voltage divider. The time constant of decay $T_{ra}$ of the compensating delay line is much larger than the time constant of rise $T_{re}$. If the difference between the voltages across the resistors 24, 26 is zero to indicate that there is no deviation, neither of the contactors controlling the servo motor 30 will be operated. In the case of a positive deviation signal which exceeds the response threshold of the amplifier 31, the contactor 28 will be operated. In the case of a negative deviation signal which exceeds the response threshold of the amplifier 32, the contactor 29 will be operated. In dependence on the deviation, the mains voltage will be applied to the servo motor 30 by the contacts of the contactors 28 or 29 to determine the direction of rotation of such motor.

It will be understood that the bias voltages of the diodes will be selected to cover the expected range of the proportional outputs of the amplifiers 31 and 32.

Owing to the non-linear resistance circuits 35, 36 in the compensating line, the control system has such a time response that the adjusted value of the proportional term remains substantially unchanged in case of a decrease in the deviation signal. Owing to this response, a doubling of the initial step change will cause the control system to produce a correcting signal having a double magnitude. When a deviation signal $x_w$ appears suddenly at the input of amplifier 31 or 32, the compensating signal $x_r'$ will increase according to a function of $e$, which is represented in FIG. 5. As is apparent from FIG. 3, the increase in the initial step change causes a decrease in the time constant of rise $T_{re}$ of the compensating line so that the motor 30 has already performed a first correcting step when the compensating signal $x_r'$ has increased to the upper, non-linear range, and the duration of said step has a linear relation to the value of the initial step change $x_w$.

The advantages which are afforded by the invention reside particularly in that the control system having a compensating line, which includes a non-linear resistance circuit, effects an aperiodic motion of the means for positioning the electrodes in spite of the fact that the speed of the servo motor is not below a lower limit, which is determined by considerations of economy, and the controlled variable is subject to changes which are reflected in the form of large initial step changes at the input of the control system. The invention is not restricted to the control of the electrode position in electric arc furnaces but may be applied wherever the controlled variable is derived from the relation of the rectified values of two electrical parameters.

What is claimed is:

1. An automatic control system which comprises a deviation signal generator having an output and operable to produce a deviation signal appearing at said output, and a compensating delay line connected to said output and operable to compensate said deviation signal with a time delay, said compensating delay line comprising a resistance means having a non-linear voltage-resistance characteristic and arranged to control the time constant of rise of said compensating delay line in an inverse relation to the value of said deviation signal.

2. An automatic control system as set forth in claim 1, which comprises relay means arranged to produce a gating signal having a predetermined magnitude when said deviation signal exceeds a threshold value, and a gate having a control electrode arranged to receive said gating signal and to render said compensating delay line operative in response to said gating signal.

3. An automatic control system as set forth in claim 1, which comprises a controller arranged to receive said deviation signal and having a proportional output for producing an output signal which varies in the same sense as said deviation signal, and in which said resistance means is adapted to receive said output signal and to control the time constant of rise of said compensating delay line in an inverse relation to the value of said output signal.

4. An automatic control system as set forth in claim 3, in which said controller is arranged to control an electric arc.

5. An automatic control system as set forth in claim 4, which comprises arc electrode position control means responsive to said controller.

6. An automatic control system as set forth in claim 5, in which said arc electrode position control means are arranged to control the position of an arc electrode in an electric arc furnace.

7. An automatic control system as set forth in claim 6, in which said electrode is connected in an electrode circuit and in which said deviation signal generator comprises a voltage divider comprising first and second resistors and arranged to develop said deviation signal, a current detector arranged to sense the current in said electrode and to apply across said first resistor a first control voltage, which is proportional to said current, a voltage detector arranged to sense the voltage applied to said electrode and to apply to said second resistor a second voltage, which is proportional to said electrode voltage and opposed to said first voltage, and a converter having an output in series with said second resistor and arranged to develop at said output a third voltage, which is opposed to said second voltage and corresponds to the mean value of the IR loss in said electrode circuit, reduced by the voltage across said arc.

8. An automatic control system as set forth in claim 7, in which said first detector comprises a current transformer connected in said circuit and having a primary winding connected in said electrode circuit and also having a secondary winding, and said converter comprises a rectifying bridge circuit, a load resistor connected in circuit with said secondary winding, a rectifying bridge circuit arranged to develop said third voltage, and a second transformer coupling said load resistor to said rectifying bridge circuit.

9. An automatic control system as set forth in claim 8, in which said second transformer includes a secondary winding and which comprises a capacitor in circuit with said secondary winding of said second transnformer, said capacitor being designed to compensate to a considerable extent that component of the secondary current of said second transformer which is due to inductance in the electrode circuit.

10. An automatic control system as set forth in claim 3, in which said controller has a relay output and which comprises a normally blocked gate having an input connected to said proportional output, an output connected to said compensating delay line, and a gating electrode connected to said relay output.

11. An automatic control system as set forth in claim 10, which comprises arc electrode position control means responsive to said relay output.

12. An automatic control system as set forth in claim 10, in which said gate comprises a thyristor.

13. An automatic control system as set forth in claim 3, in which said controller has a deviation signal input arranged to receive said deviation signal and said resistance means comprise a first resistance connected between said proportional output and said deviation signal input, and a plurality of series connections connected in parallel to said first resistance, each of said series connections comprising an additional resistance and a diode, said control system comprising biasing means arranged to apply to said diodes different bias voltages determining threshold voltages of said diodes.

14. An automatic control system as set forth in claim 1 which has a single-point action.

15. An automatic control system as set forth in claim 1 in which said deviation signal generator is arranged to produce said deviation signal in response to the relation between rectified signals derived from vectors of two interrelated vectorial parameters.

16. An automatic control system as set forth in claim 15, in which said deviation signal generator is arranged to produce said deviation signal in response to that component of one of said vectorial parameters which lies in the direction of the vector of the other of said parameters.

17. An automatic control system as set forth in claim 1, which comprises a capacitor in series with said resistance means.

18. An automatic control system as set forth in claim 17, in which said compensating delay line comprises a discharge resistance connected in parallel to said capacitor and determining together with said capacitor a time constant of decay of said compensating delay line which is larger than said time constant of rise.

References Cited

UNITED STATES PATENTS 3,188,376  6/1965  Lyman _____ 13—13 X
3,364,295  1/1968  Roberts _____ 13—13

BERNARD A. GILHEANY, *Primary Examiner.*

R. N. ENVALL, JR., *Assistant Examiner.*